(12) United States Patent
Imsand (10) Patent No.: US 6,654,235 B2
(45) Date of Patent: Nov. 25, 2003

(54) PORTABLE WORKSTATION COMPUTER

(76) Inventor: Bruce Imsand, 156 Murry Dr., Madison, AL (US) 35758

( * ) Notice: Subject to any disclaimer, the term of this patent is extended or adjusted under 35 U.S.C. 154(b) by 315 days.

(21) Appl. No.: 09/746,317

(22) Filed: Dec. 22, 2000

(65) Prior Publication Data

US 2001/0048585 A1 Dec. 6, 2001

Related U.S. Application Data

(60) Provisional application No. 60/177,935, filed on Jan. 25, 2000.

(51) Int. Cl.$^7$ ................................................. G06F 1/16
(52) U.S. Cl. ....................... 361/683; 361/687; 206/320; 206/576; 312/223.3; D14/335; 150/165
(58) Field of Search ................................. 361/683, 685, 361/646, 625; 206/576, 320, 305, 720, 721, 701; 312/223.1–223.3, 827; 150/165, 154; D14/335, 336, 107, 106, 100

(56) References Cited

U.S. PATENT DOCUMENTS

| | | | |
|---|---|---|---|
| 4,294,496 A | | 10/1981 | Murez |
| D287,724 S | | 1/1987 | Keely et al. |
| 4,832,419 A | | 5/1989 | Mitchell et al. |
| 4,839,837 A | | 6/1989 | Chang |
| 4,852,032 A | | 7/1989 | Matsuda et al. |
| 5,021,922 A | | 6/1991 | Davis et al. |
| 5,105,338 A | * | 4/1992 | Held ........................... 361/683 |
| 5,107,402 A | | 4/1992 | Malgouires |
| 5,157,585 A | | 10/1992 | Myers |
| 5,163,560 A | * | 11/1992 | Parrish et al. ............... 206/576 |
| 5,229,757 A | | 7/1993 | Takamiya et al. |
| 5,242,056 A | * | 9/1993 | Zia et al. ..................... 206/576 |
| 5,247,285 A | | 9/1993 | Yokota et al. |
| 5,260,884 A | | 11/1993 | Stern |
| D344,266 S | | 2/1994 | Wingate |
| 5,305,183 A | * | 4/1994 | Teynor ........................ 361/686 |
| 5,442,512 A | | 8/1995 | Bradbury |
| 5,612,852 A | | 3/1997 | Leverault et al. |
| 5,646,820 A | * | 7/1997 | Honda et al. ................ 361/683 |
| 5,774,331 A | | 6/1998 | Sach |
| 5,825,614 A | | 10/1998 | Kim |
| D414,751 S | * | 10/1999 | Yogalingam ................ D14/335 |
| 5,961,192 A | * | 10/1999 | Bernart et al. ............ 312/223.3 |
| 5,992,155 A | * | 11/1999 | Kobayashi et al. ......... 361/687 |
| 6,028,764 A | | 2/2000 | Richardson et al. |
| 6,206,480 B1 | * | 3/2001 | Thompson ................... 361/625 |
| 6,229,698 B1 | * | 5/2001 | Harvey ........................ 361/683 |
| 6,257,381 B1 | * | 7/2001 | Harfst ......................... 190/108 |
| 6,257,407 B1 | * | 7/2001 | Truwit et al. ................ 206/320 |
| 6,442,018 B1 | * | 8/2002 | Dinkin ........................ 361/683 |

FOREIGN PATENT DOCUMENTS

| | | | | |
|---|---|---|---|---|
| DE | 4400853 A1 | * | 7/1995 | ............. G06F/1/16 |
| DE | 29615516 U1 | * | 10/1996 | ............. A45C/5/00 |
| DE | 29704585 U1 | * | 4/1997 | ............. A45C/3/02 |
| DE | 19811748 A1 | * | 4/1999 | ............. A45C/5/12 |
| EP | 965904 A1 | * | 12/1999 | ............. G06F/1/16 |
| FR | 2652243 A3 | * | 3/1991 | ............. A45C/11/00 |
| FR | 2782400 A1 | * | 2/2000 | ............. G06F/1/16 |
| JP | 06274456 A | * | 9/1994 | ............. G06F/15/02 |
| JP | 11313709 A | * | 11/1999 | ............. A45C/11/00 |

* cited by examiner

Primary Examiner—Lisa Lea-Edmonds
(74) Attorney, Agent, or Firm—Bradley Arant Rose & White LLP (57) ABSTRACT

A portable workstation computer is disclosed. The computer includes a display assembly adapted to be mounted between a frontal concave member and a rearward concave member. A keyboard, mouse, and accessories may be stored in the frontal concave member. Processing, memory, and storage components are housed in the rearward concave member. The display assembly may be interposed between the frontal concave member and the rearward concave member in a briefcase configuration, forming a casing for the computer.

47 Claims, 8 Drawing Sheets

PORTABLE WORKSTATION COMPUTER

This application claims the benefit of the provisional application accorded Ser No. 60/177,935 and filed on Jan. 25, 2000 in the United States Patent and Trademark Office.

BACKGROUND

Designers, engineers, animators, digital video editors, digital content creators and other technical professionals use the highest performance PC technology available and the most demanding computer graphics and imaging software applications. The most demanding applications typically can not run or perform adequately on conventional notebook style PC's, a trend that is likely to continue as applications continually raise their minimum requirements. These applications usually require the maximum available processor performance, physical memory sizes 4 to 8 times those available on notebooks, disk performance 5 times that of notebooks, display resolutions of at least 1280×1024, and professional 3D graphics using OpenGL which do not exist at all on today's notebook computers. The best performance typically requires at least 10 to 20 times the energy delivered from the present battery technology. Despite the fact that computer technology is constantly evolving and improving, distinctions between the performance and capabilities of what is commonly referred to as a "notebook PC" and what is commonly referred to as a "workstation" remain. Tower-style chassis and CRT-based display monitors of the typical workstation typically together weigh 100 pounds or more and require high-volume packing materials. As a result, the portability of such systems is limited.

Today's technical professionals can, and often do, work at home, away on business and outside normal business hours. Because they require access to their high performance computer and their application software, many companies are even providing duplicate home computer systems for their design engineers, analysts, and animators in order to increase overall productivity. Having duplicate systems does not address the need for high performance PC workstations while traveling, or for spontaneous use at the client's site.

Other professionals require both a full-featured workstation and a notebook PC. The professional still performs all of his or her power-intensive, technical work on the full-featured workstation, but requires the mobility of the notebook to fulfill the minimum office automation needs of the professional working away from the office, such as email and word processing. As a result the professional must purchase two computers rather than one, and much of the heavy technical work must wait until he can return to the office. The notebook PC does not solve the portability problem for the technical professional.

Specifically, a mobile technical professional has the following needs in a workstation-class computer: Carry the design process to the client and complete the work on site; bring live computer models of the project to a prospect client for an interactive sales presentation; demonstrate high-end software products and capabilities on a sales call; continue to do complex design after working hours at home (without a duplicate workstation); use the same computer for every task in the office, at home and on the road; have a truly portable workstation, rugged enough to withstand the bumps and jolts of travel.

There have been some efforts to provide technical professionals with portable systems for field use, but all such attempts have had significant compromises on the design of keyboard and pointer technology, graphics technology, display performance, and level of integration. For example, display sizes have been limited to maximum sizes of 15" using passive back-planes or standard components, and designed without regard to component shock protection. In general, these products have not been designed to meet the specific demands of the design professional. Such efforts have focused on a transportable on-the-run computer with some full-size computer features, rather than a high performance workstation without compromise while at the same time being easily transportable.

In part, the compromises in performance of prior art machines is attributable to the absence of certain enabling technology, which has become available only recently. Such technology includes large, high brightness 17" and 18.1" (viewable area) LCD flat-panel display technology with resolutions of 1280×1024 or higher and supporting 24-bit per pixel true color images; digital video interface standards allowing high speed digital connections to such panels; and best-of-class 3D graphics technology using the above digital video interface standards suitable for use in high-end 3D applications. The advent of these building blocks, however, has not solved the problems of portability and durability. A new mechanical package, which is both portable and durable, is needed.

Moreover, as with any product, cost must be reasonable, and this is only possible using standard available workstation components. These standard components, such as the disk drive the processor module and motherboard are designed for use in the relatively immobile environment of the tower-style chassis. They are not designed to withstand the acceleration forces and vibrations which a portable system must endure. Shock management systems are needed to ensure that the portable workstation is robust and secures the safe transport of important data as well as expensive computer components. Power supplies, high performance processors and other components usually generate significant heat and require adequate ventilation. In addition, the system must be impact resistant and dust tolerant. As with all computer products, it should be easy to service, flexible for popular options, quiet, attractive, and ergonomically designed for the user.

Thus, there exists a need for a truly portable, high performance workstation computer, of reasonable cost, which will allow the technical professional to perform computer-intensive design, modeling, and presentation work without regard to location; which will withstand the environment of the field; and which will satisfy the serviceability, flexibility, and ergonomic requirements of the technical professional.

SUMMARY

The present invention satisfies these needs by providing novel modular packaging and a shock resistant mechanical housing for a workstation computer designed to meet the specific needs of professional power users. The system meets the performance specification of high performance workstations, but with a volume of approximately 1 cubic foot and a weight of less than 35 pounds in a preferred embodiment. It is rugged enough to transport as a brief case, be carried on an airplane, and checked as ordinary luggage. The system is designed to be a full-featured performance workstation which can be set up on the desktop similar to any other workstation, but with the ability to completely pack up and travel with the user in a matter of minutes. The system requires AC power of approximately 150 watts and provides high end workstation-class display, keyboard, disk, memory, and graphics performance. It is, in fact, a full-featured workstation with the added benefit of being small and light enough to pack and carry anywhere a brief case can be taken.

In a preferred embodiment, the invention comprises the processing, storage, and input/output components of a workstation computer transported and housed in removably attachable sections. These sections include a display assembly comprising a display and a display frame having a front face and a back face, with the display mounted in the display frame; a frontal concave member having a rearward opening adapted to mate with the front face of the display frame; a rearward concave member having a frontal opening adapted to mate with the back face of said display frame, the rearward member comprising a mounting plate attached thereto proximate its opening, whereby an enclosure is formed in which the processing, storage, and input/output components are mounted. The display assembly may be interposed between the frontal concave member and the rearward concave member, forming a casing for the computer.

Further, the embodiment includes a first and second fastening means, preferably comprising spring-biased threaded pins, and gates slidably mounted to the rearward concave member. The rearward concave member has portals in its side walls which are alternatively revealed and enclosed as the gates slide from an extended position to a retracted position. The first fastening means allow for securing and releasing the first end cap to the display assembly, and also for attaching the display assembly to the slidable gates. Each gate may include a cam cut which is engaged by a pin of the first fastening means acting as a cam follower, allowing for variable placement of the display assembly. The second fastening means allows for securing and releasing the slidable gates, which move from a retracted position, in which they act as dust covers for input output devices and connectors within the rearward concave member, to an extended position, in which they act as a stand for the display. With the gates in the extended position, the input/output devices and connectors are accessible through the portals in the side walls of the rearward concave member. The mounting plate, to which the motherboard and other elements of the computer subsystem are attached, may be affixed to the rearward concave member through shock isolators. The preferred embodiment may further include conductive material located on the rearward concave member and in contact with the mounting plate to act, in conjunction with the member itself, as an EMI shield when the system is assembled. Preferably, the conductive material is resilient and tubular in shape, forming a gasket, such that it also functions as a dampener to absorb vibrations, halt any oscillations of the shock isolators described above, and thus further protect the electronic components.

DESCRIPTION OF THE DRAWINGS

These and other features, aspects, structures, advantages, and functions are shown or inherent in, and will become better understood with regard to, the following description and accompanied drawings where.

DESCRIPTION OF A PREFERRED EMBODIMENT

The invention comprises a workstation-class computer housed in modular sections that can be packed up into a briefcase-like configuration for storage or travel and quickly unpacked and configured into an ergonomic workstation computer. In a preferred embodiment, a display assembly is sandwiched between and affixed to frontal and rearward concave members to form a rugged, transportable briefcase. The frontal concave member, also referred to as the first end cap or accessory pack, is capable of housing a keyboard, mouse, and other accessories. The second concave member houses processing, memory, and input/output components. To facilitate accessibility of these components, the second concave member may be comprised of two discreet modules, a midsection and a removable end cap. As described more fully below, in the in-use configuration, the first end cap is removed entirely from the briefcase, revealing the display assembly. The display assembly is adjustably mounted to the second concave member and may be moved into an ergonomic viewing angle for use.

Figure 1:
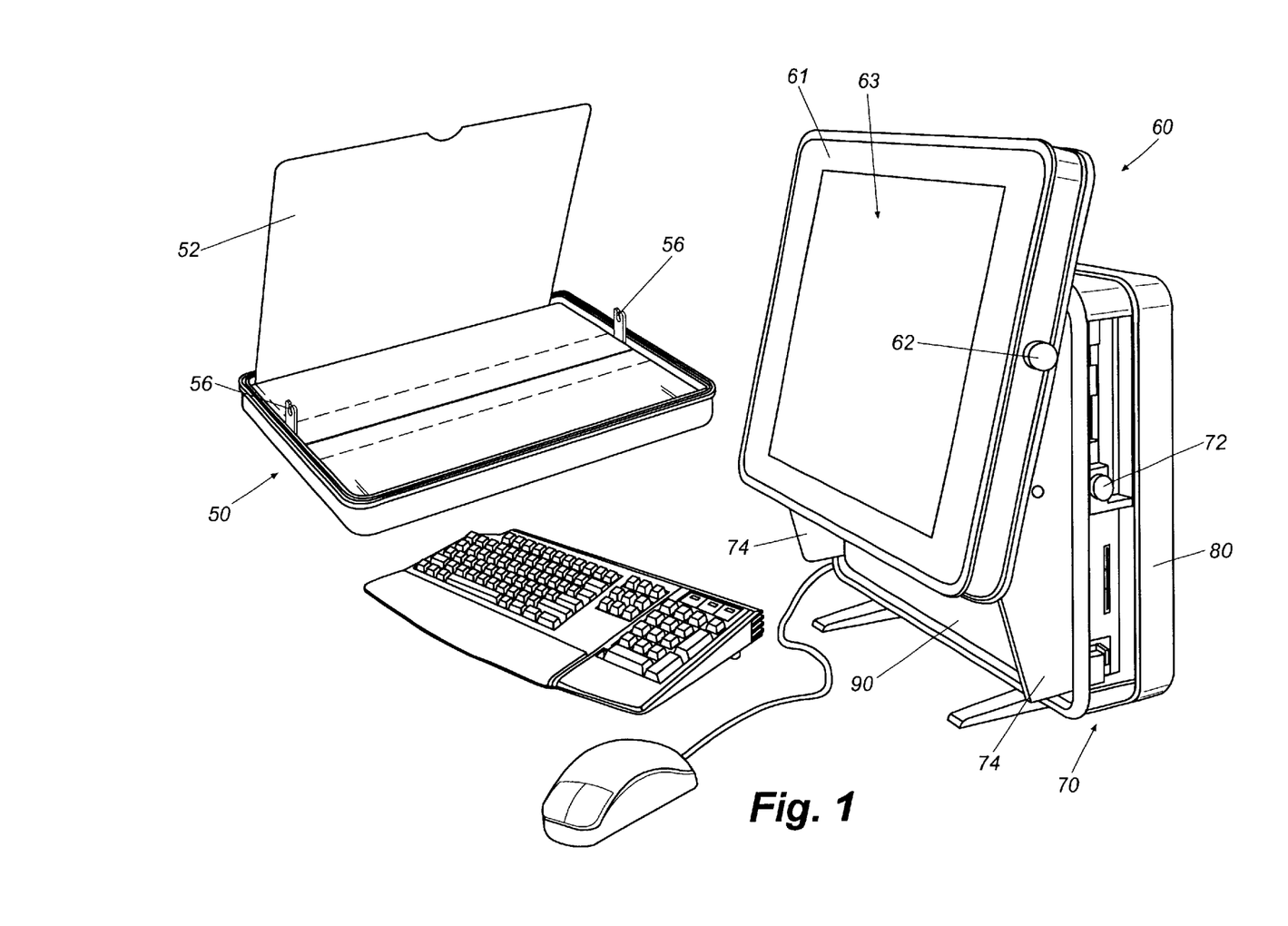
FIG. 1 is a perspective view of an embodiment of the present invention in an unpacked and ready-for-use configuration.

FIG. 1 shows an embodiment of the present invention set up for use with the first end cap 50 removed. Also shown are the display assembly 60, midsection 70, and second end cap 80. The display assembly comprises a display frame 61 and a flat panel display, such as an LCD, 63. The motherboard and other computer components, such as the disk drives, are mounted on a mounting plate 90 (the back of which is shown), which is secured to the midsection 70. The computer components are therefore protected within the enclosure formed by the midsection 70, the second end cap 80, and the mounting plate 90.

The accessory pack of this embodiment is an approximately 1.75" deep by 18.6"×13.6" drawn aluminum structure and makes up one side of the brief case when the unit is in its packed up condition. The accessory pack may contain compartments for holding the keyboard, mouse, power cords, and miscellaneous items such as CD media, floppy media, and if needed, an external ZIP or JAZZ disk drive. A rigid flap 52 isolates the contents of the accessory pack from the adjoining flat panel display.

Figure 2:
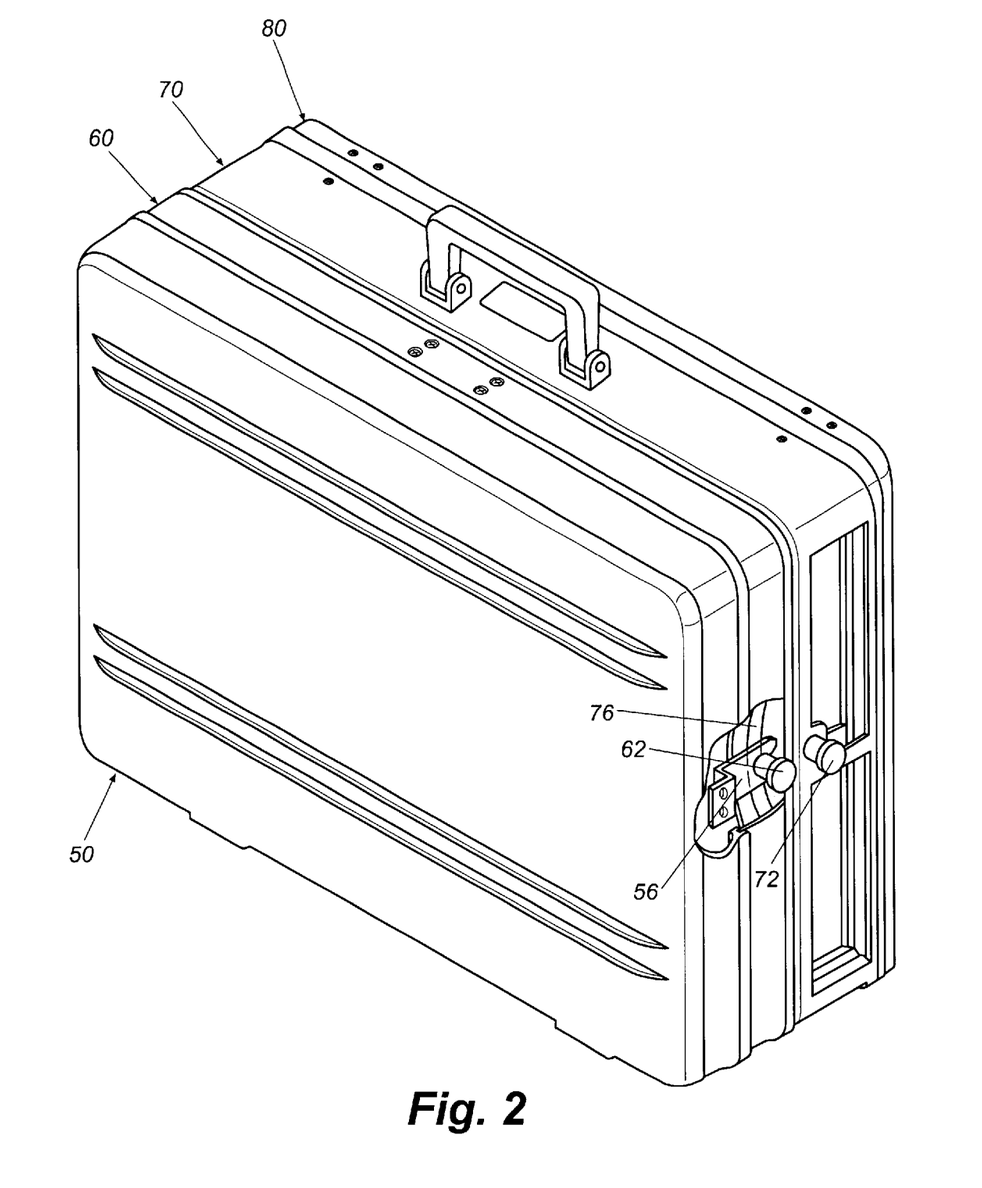
FIG. 2 is a perspective, partially broken away view of the device of FIG. 1, in a packed up and ready-for-travel configuration.

In FIG. 2, the system is packed up into a briefcase size package and is ready to be transported. This embodiment has a weight of less than 35 pounds with dimensions of approximately 19"×14"×7.5". As shown, the external perimeter of the display frame serves as part of the external casing when the system is in its packed-up configuration, thus allowing for a maximum size display panel. The mechanical components are constructed from a variety of drawn, extruded, and sheet aluminum. Other materials could be used, such as plastics, titanium, other metals, and composites, and would be well known to those skilled in the art. Aluminum is chosen for its light weight and relatively low cost. In the packed configuration, the external casing covers and encloses electronic components and connectors.

The accessory pack may be removed from the unit by releasing a first set of pin assemblies 62, which are located on the display assembly 60. As shown in FIG. 2, a pair of mounting brackets 56 (only one of which is shown) is affixed to the accessory pack. The display frame has slots on its front side to receive these brackets. The mounting brackets hold the accessory pack in place when the brackets are inserted into slots on the display and secured by the pin assemblies 62.

Figure 4:
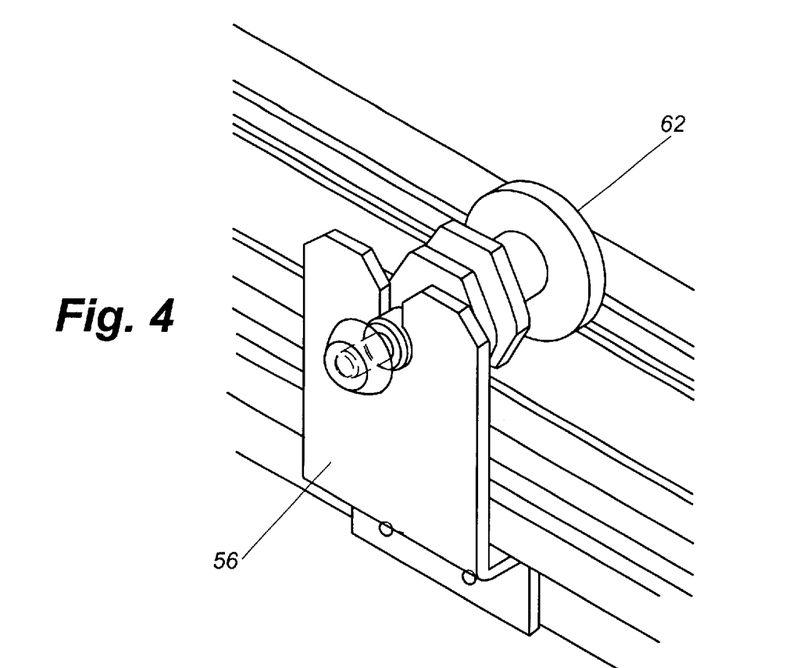
FIG. 4 is an enlarged perspective view of the mounting bracket of the first end cap shown in FIGS. 1 and 2, illustrating how the mounting bracket engages the first pin assembly.

FIG. 4 is a detailed view of a preferred embodiment of the pin assembly of the present invention. The assembly comprises an elongate shank or barrel terminating in a knob or handle on one end and a pin or cam follower, of a smaller diameter than the barrel, on the other. The shank is slidably housed within a sleeve or collar (not shown), in which a spring or other biasing means (also not shown) may be used to bias to the shank in its extended position, shown in FIG. 4. In that position, the cam follower may extend through and engage the cam cut in the gates, and the larger diameter shank is extended through the mounting bracket 56, fixing it in place. Further, a portion of the shank and housing may be threaded so that the assembly may be tightened into its extended position. By doing so, the end of the larger diameter shank may bear tightly against the area of the gate proximate the cam cut (with the cam follower extending through the cut), such that resultant frictional force fixes the display assembly in place relative to the cam on the gate. When the shank is unscrewed and pulled into its retracted position, the smaller diameter terminal pin is aligned with the mounting bracket 56, allowing the bracket to be separated from the pin assembly, so that the accessory pack may be removed from the display.

Figure 3A:
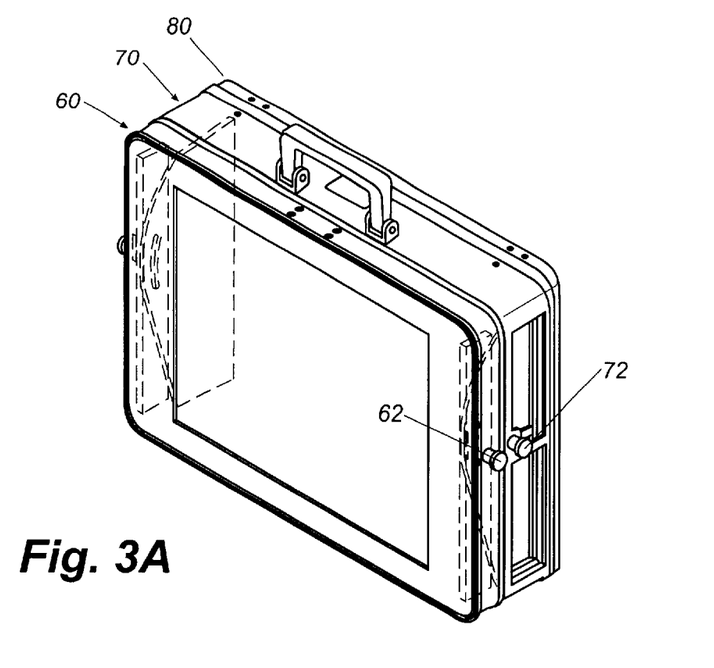
FIG. 3 is a perspective view of the device of FIG. 1, with the first end cap removed, and the display in a retracted position.
Figure 3B:
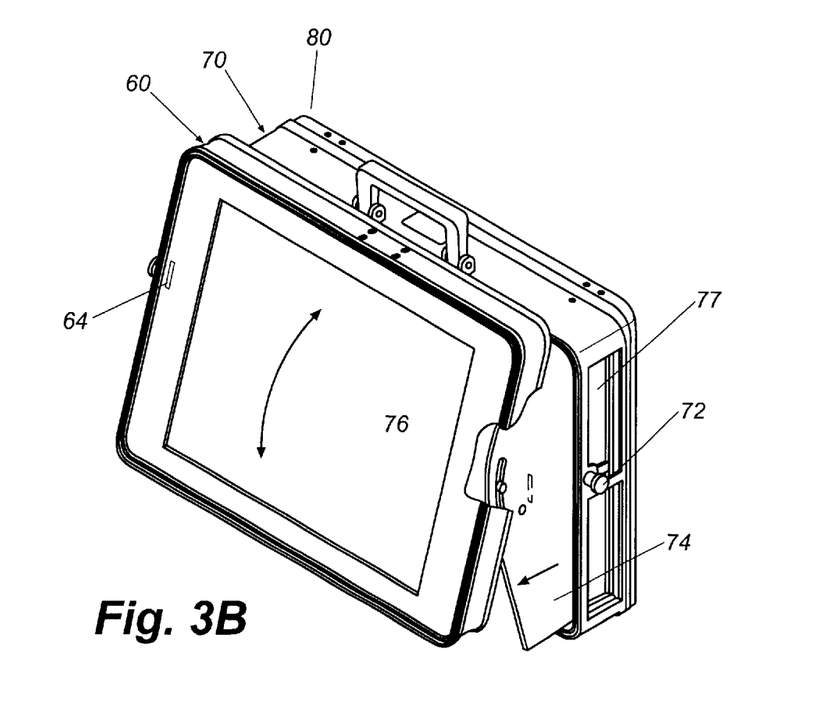
FIG. 3B is a perspective, partially broken away view housing the device with the display in an extended position adjusted to an ergonomic viewing angle.

With the accessory pack removed, the system is as shown in FIGS. 3A and 3B. A pair of gates 74 are slidably attached to the side walls of the midsection. Each gate has a curved front edge, with an aperture therethrough preferably in the form of an arcuate cam cut, which extends into a second slot on the rear side of the display frame. The first pin assemblies 62 engage this cam cut as described above and thus hold the display in position on the gates. Each gate has at least one other aperture proximate its rear edge, which is engaged by a second set of pin assemblies 72 located in the midsection. Releasing pin assemblies 72 located in the midsection allows gates 74 and the display assembly 60 to slide into their extended position (as shown in FIG. 3B), about 1.75" forward of the midsection. The gates may have a small aperture or apertures near their rearward and forward edges, which, when engaged by the pin assemblies 72, fix the gate position. As the gates extend, all media disk drives and all I/O connectors and ventilation holes are revealed through portals in the midsection walls and become accessible. See FIG. 1. Such elements including a floppy, CDROM drive, external SCSI connector, and power connector. The display may be placed into an ergonomic viewing position, as shown in FIG. 3B, by releasing the first set of pins and sliding the display assembly along the cam 76 in the gates 74 and securing the pins when the display is in the desired position. Thus, the first securing pin assemblies 62 secure the accessory pack 50 to the display frame, act as cam followers in the "J" cam cuts 76, and provide a friction tilt lock by screwing down once the display 60 is in the desired position. A small inverted "J" hook at the top of the cams 76 may be used to provide a stable resting place for the display assembly 60 and associated first securing pins 62 when display is in its normal operating position. The display assembly's center of gravity may be designed to be slightly off the assembly's midpoint, so that the assembly riding in the cam 76 tends towards an off-vertical angle, which is ergonomically preferable.

Figure 5:
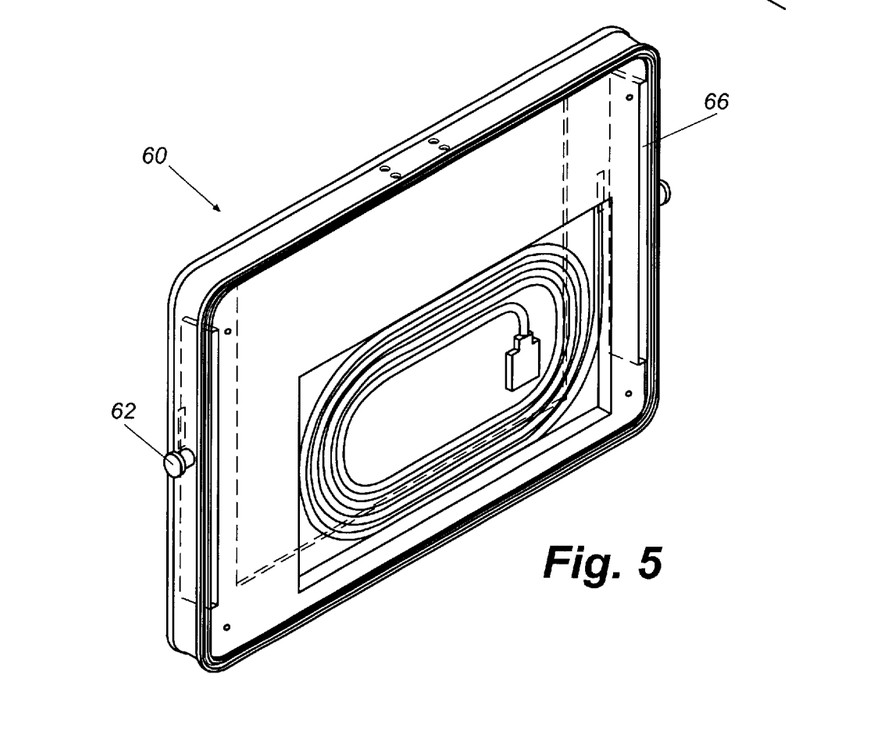
FIG. 5 is a rear perspective view of the display assembly of FIG. 1.

The display assembly 60 may be removed entirely from the gates 74 by unscrewing and releasing the pin assemblies 62. The display assembly 60 as removed from the remainder of the system is shown in FIG. 5. Note the short slots 64 on the front side of the display frame, which are adapted to accept the mounting bracket 56 of the accessory pack 50. Also note the long slots 66 on the rear side of the display 60, which are adapted to accept the gates 74.

Figure 6:
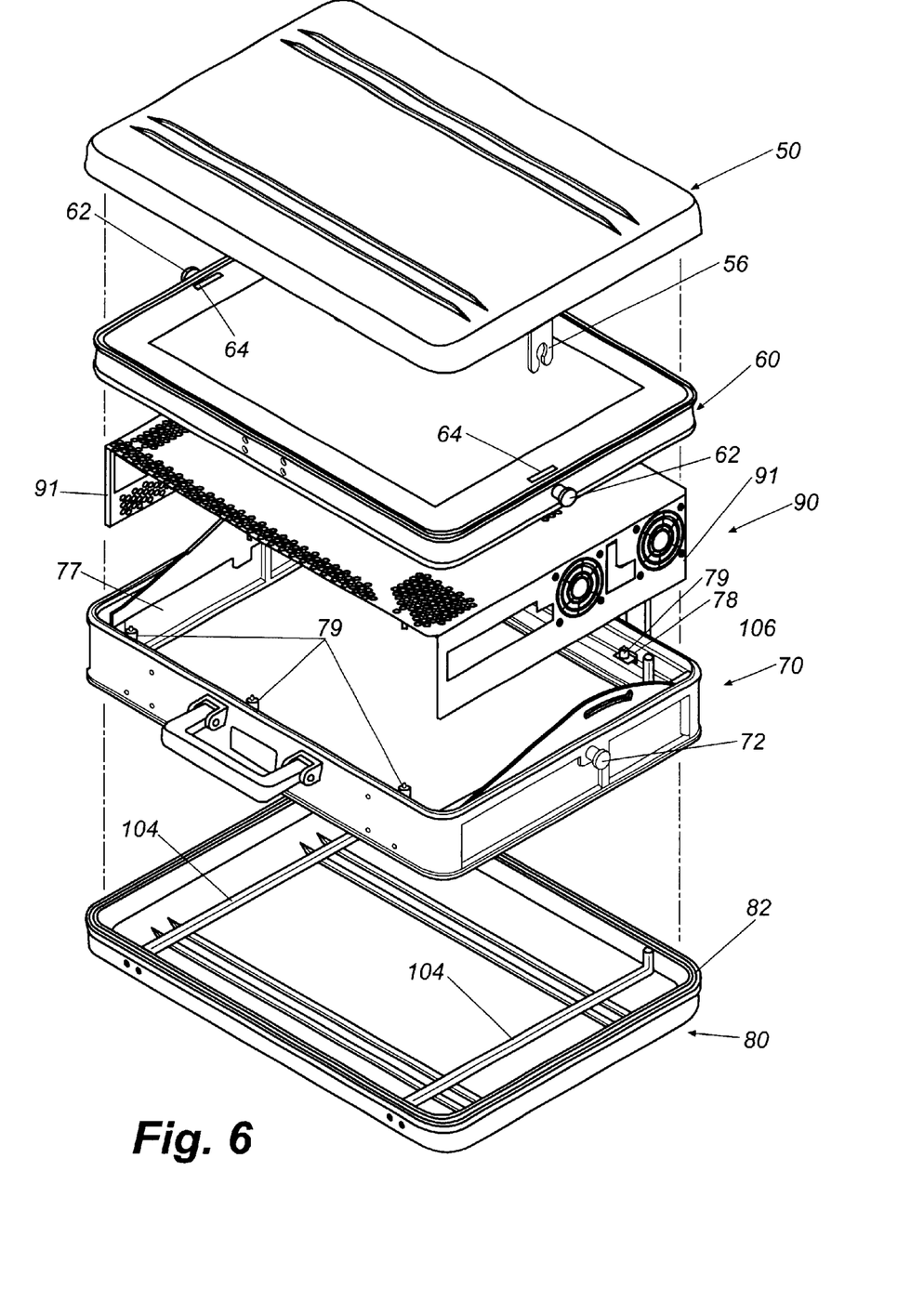
FIG. 6 is an exploded view of the device of FIG. 1.

FIG. 6 is an exploded view of the system. Note that one gate 74 is shown in its extended position and the other is shown in its retracted position. In their retracted position, the gates 74 cover and protect I/O devices, ports, and connectors from dust and other environmental hazards, such as rain, mist, or debris (see FIG. 2). In their extended position, the gates 74 allow full access to these components (see FIG. 1). A plurality of supports 78 and shock isolators 79 are shown. The supports 78 attach to a reinforcement extrusion on the midsection for stability. Standoffs on the mounting plate 90 are attached to the supports 78 through the shock isolators 79. Thus, the computer subsystem secured to the mounting plate 90 floats on numerous shock isolators 79 providing important protection against rough handling and accidents. The shock isolators 79 may be made of a shock absorbent polymer or similar flexible, resilient, and dampening material, and they provide the mounting plate 90 approximately 0.1" of free travel in each direction before hard contact with the midsection.

Figure 7:
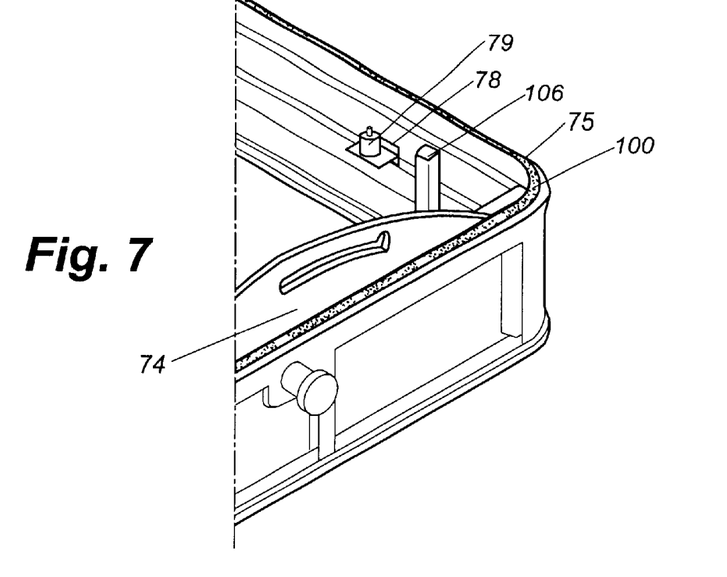
FIG. 7 is an enlarged view of a portion of the perimeter of the midsection of the device shown in FIG. 1.

FIG. 7 is an enlarged view of a portion of the midsection revealing a small EMI gasket 100 fitted into a groove in the perimeter of the midsection. A similar groove and gasket (not shown) are located on the perimeter of the underside of the midsection. The edges of the mounting plate 90, when it is secured to the supports 78 as described above, contact the small EMI gasket 100. Similarly, the perimeter of the second end cap 80 comprises a lip 82, which is adapted to mate with the groove 75 on the underside of the midsection and snug securely against the second small EMI gasket 100. Large EMI gaskets 104 are placed proximate each of the corners of the midsection. Similarly, large EMI gaskets 106 transverse the second end cap, in alignment with gaskets 104 (see FIG. 6). The large EMI gaskets 104 and 106 are adhesively fastened to the midsection and second end cap, respectively, and are positioned to engage the perimeter of orthogonal wings 91 (see FIG. 8) of the mounting plate 90 when the unit is assembled. As a result, when assembled the entire perimeter of the mounting plate 90 is in constant contact with EMI gaskets, which are of a conductive material, forming an effective EMI cage in conjunction with the aluminum end cap and midsection.

The EMI cage thus formed serves a second function. In addition to being conductive, the EMI gaskets 100, 104, and 106 are made of a resilient material, and preferably are tubular in cross-section. These characteristics seal and unitize the assembled second end cap, midsection, and mounting plate. Their resilient nature causes the gaskets to the act as dampeners and thus further isolate the mounting plate and associated electronics from vibrations. In addition, the gaskets limit the travel of the mounting plate on the shock isolators 79 and critically dampen oscillations or resonant vibrations from this movement. In combination, the shock isolators and EMI gaskets provide a high level of protection from vibration, which allows for the use of standard workstation components. Further, the orthogonal wings, which may be made of thin sheet of perforated aluminum, serve a shock-absorbing function. If the machine is struck by a significant force which fully compresses the shock isolators 79 and EMI gaskets, the force is passed into the wings which may deform or even crumple as they absorb the force. This deformation of the easily replaced mounting plate may save the more expensive computer components from a mechanical shock-related failure.

Figure 8:
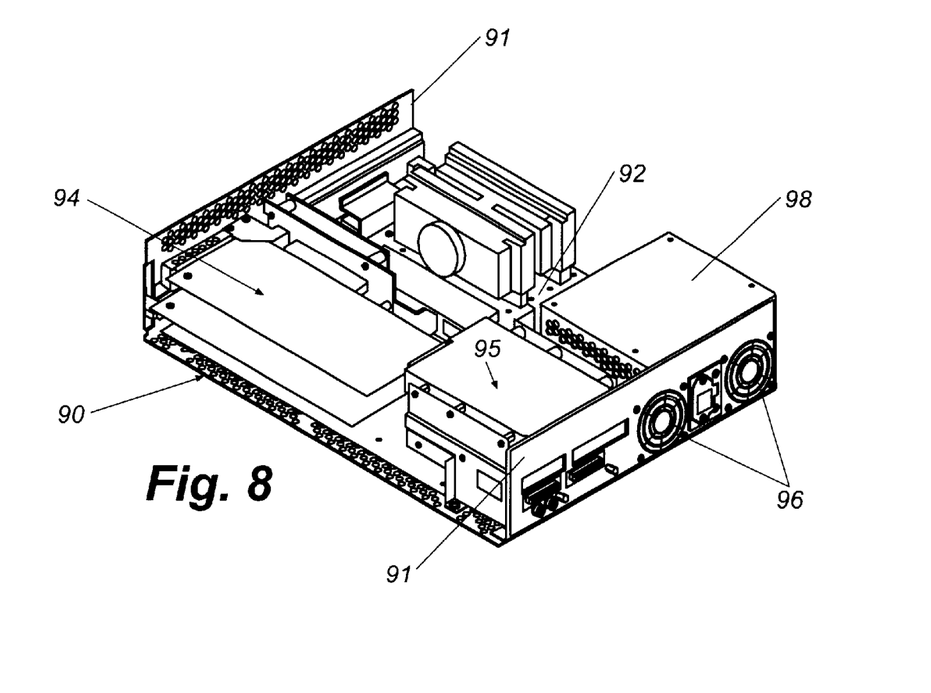
FIG. 8 is a perspective view of the mounting plate and main board with electronic components installed before assembly into the midsection.

FIG. 8 shows several significant computer subsystem components, which are mounted to mounting plate 90. The main board (or motherboard) 92 mounts to the plate 90 with screws connecting to standoffs pressed into the plate 90. The plate 90 may have selectively located ventilation holes for facilitating air flow to specific motherboard components. By way of example and not of limitation, the computer subsystem includes the following components (though not all are illustrated): motherboard 92 including dual Pentium microprocessor modules, memory sockets and standard I/O including parallel port, 2 serial ports, 2 USB ports, stereo IN/OUT, PS/2 connections for keyboard and mouse, 10/100 Ethernet (RJ45 connector); dual channel Ultra2 SCSI controller and connectors; dual EIDE controller and connectors; disk drive stack 95 including mounting bracket, LS-120 super floppy, CD or DVD disk, SCSI hard disk, interconnect back-plane for LS-120 and CD or DVD drive; power supply 98; dual cooling fans 96; PCI/AGP riser card stack assembly 94 consisting of PCI right angle riser, AGP right angle riser, fasteners, AGP graphics card, and user supplied PCI card (optional). It is understood that computer technology is rapidly developing and advancing, and these components are simply exemplary of a preferred embodiment. They are detailed here to emphasize the full-featured nature of the computer subsystem of this embodiment of the present invention.

Figure 9:
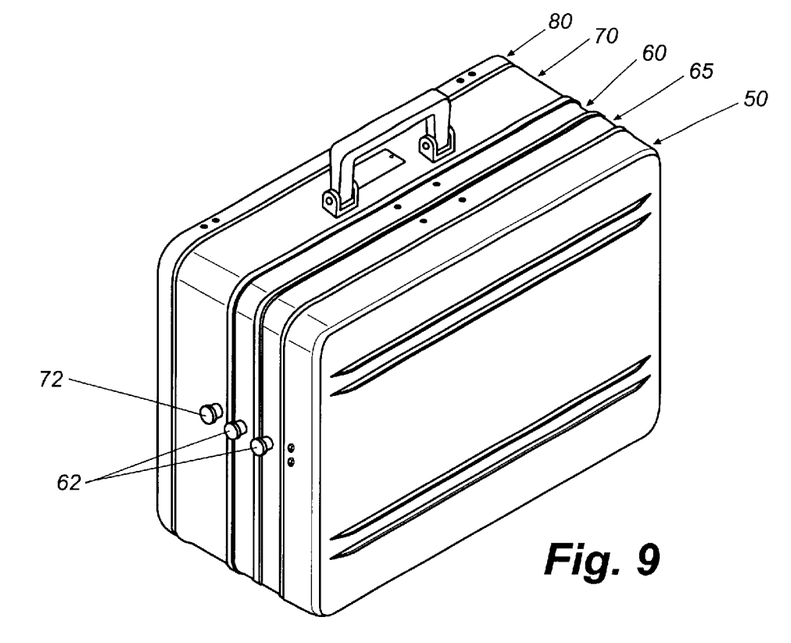
FIG. 9 is a perspective view of a dual-screen embodiment of the present invention, in a packed up and ready-for-travel configuration.
Figure 10:
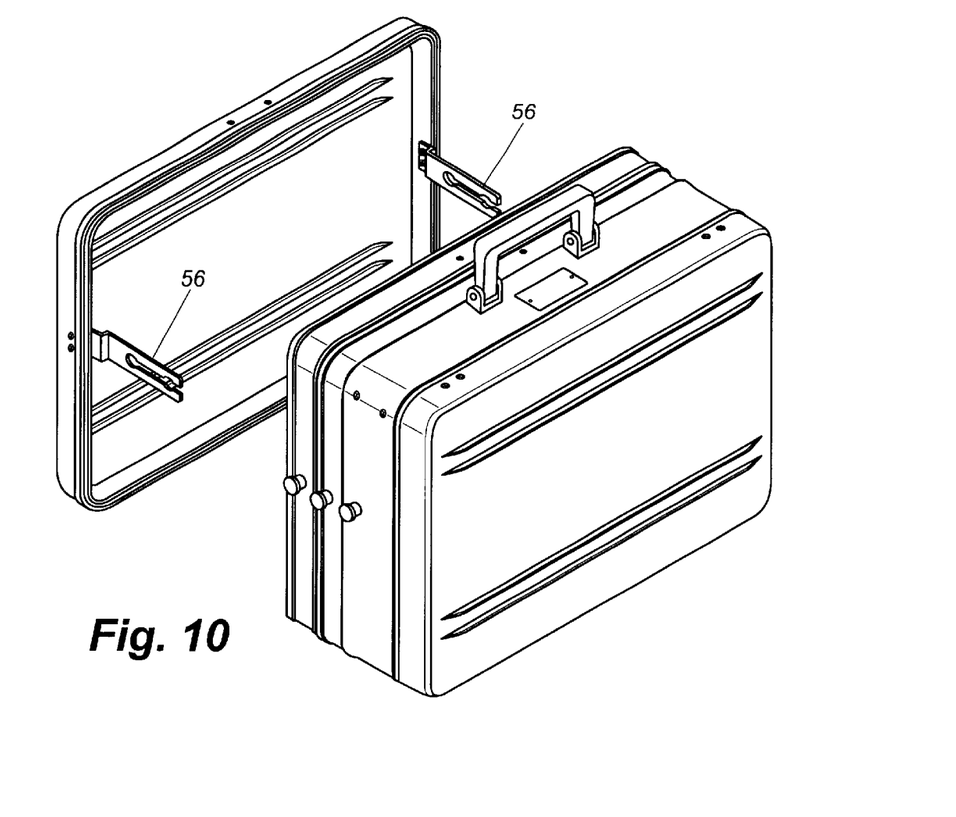
FIG. 10 is a perspective view of the device of FIG. 9, with the first end cap removed, showing the elongated mounting brackets of this embodiment.
Figure 11:
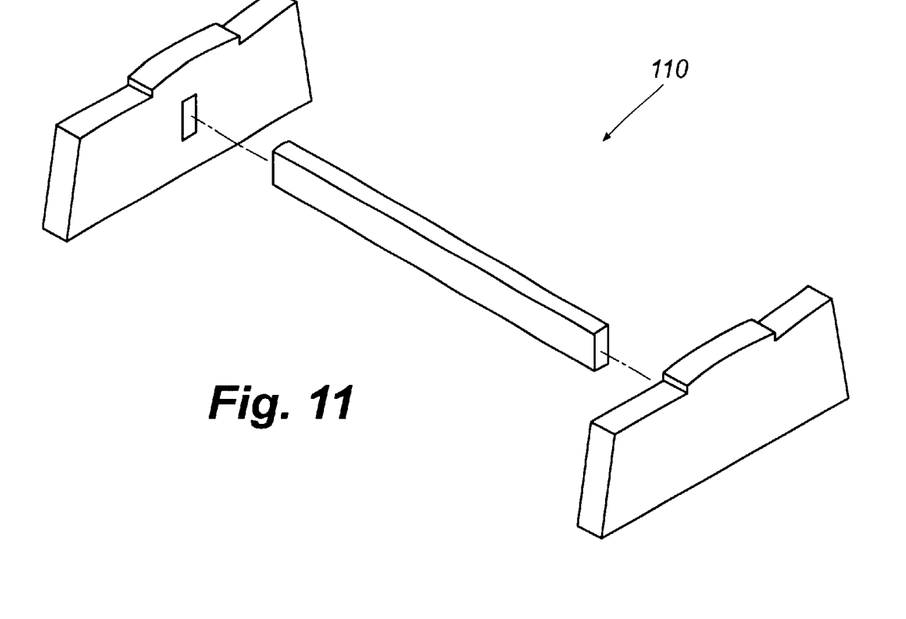
FIG. 11 is a perspective view of a display stand for the second display panel of the device of FIG. 9.
Figure 12:
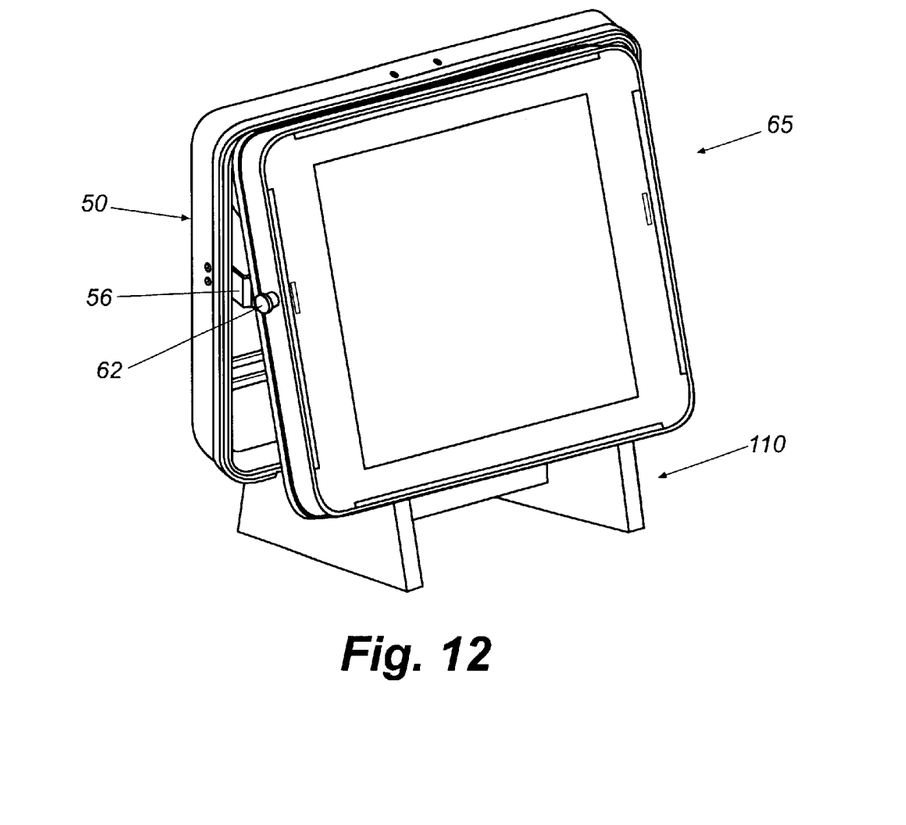
FIG. 12 is a perspective view of the second display of the device of FIG. 9 in position on the display stand of FIG. 10.

A dual screen embodiment is shown in FIGS. 9 and 10. In this embodiment, as shown in FIG. 10, the mounting brackets 56 are longer and extend through the first display unit 60 and into the second display unit 65, allowing the securing pins in each display assembly to engage the brackets when the unit is in its packed-up configuration. A stand 110 is shown in FIG. 11, which may be disassembled and transported in the accessory pack. As shown in FIG. 12, the second display and accessory pack form an A-frame which is held in position by the pin assembly of the second display engaging the mounting bracket of the accessory pack. This A-frame may be placed on the stand 110 for viewing. The stand 110 is sized to allow the second display to be positioned next to and in alignment with the first display for optimal viewing. The base of the external case may also include a threaded female recess sized to accept a standard camera mount, such as on a tripod, thus allowing the entire unit to be elevated for presentations and the like.

Although the present invention has been described and shown in considerable detail with reference to certain preferred embodiments thereof, other embodiments are possible. The foregoing description is therefore considered in all respects to be illustrative and not restrictive. For example, the lessons taught in the specific design set forth above are generally applicable for systems both larger, incorporating 21.3" flat panel displays (and even larger displays, yet to be developed), and smaller, using 15" display components. It should also be understood that even in the single screen embodiment, the display may be detached and mounted on an external stand as desired by the user. The second end cap and midsection may be joined together in one integral module. Upon reading the foregoing disclosure, this and other variations would be apparent to those skilled in the art. Therefore, the present invention should be defined with reference to the claims and their equivalents, and the spirit and scope of the claims should not be limited to the description of the preferred embodiments contained herein.

I claim:

1. A computer comprising:
    processing, storage, and input/output components; and
    removably attachable sections, said sections comprising:
       a display assembly comprising a display and a display frame having a front face and a back face, said display mounted in said display frame;
       a frontal concave member having a rearward opening adapted to mate with the front face of said display frame;
       a rearward concave member having a frontal opening adapted to mate with the back face of said display frame, the rearward member comprising a mounting plate attached thereto proximate its opening, whereby an enclosure is formed in which the processing, storage, and input/output components are mounted;
    such that said display assembly may be interposed between said frontal concave member and said rearward concave member, forming a casing for the computer.

2. The computer of claim 1, further comprising:
    means for slidably mounting the display assembly to the rearward concave member such that the display assembly may be reciprocated from a storage position in which it is mated to the rearward concave member to an extended position forward of the rearward member.

3. The computer of claim 2, further comprising:
    means for adjusting the angle and height of the display assembly.

4. The computer of claim 2, wherein
    the rearward concave member comprises portals for accessing input/output components mounted therein; and
    further comprising:
       means for covering and uncovering the input/output components when the display assembly is reciprocated from its storage position to its extended position.

5. The computer of claim 1, further comprising:
    at least one gate, the gate having a frontal edge and a rearward edge and being slidably mounted to the rearward concave member, such that the gate may move from a rearward retracted position to a forward extended position;
    and wherein the display frame comprises a rearwardly opening slot on its back face, the rearward slot positioned and sized to accept the frontal edge of the gate;
    and further comprising means for removably securing the gate to the display frame;

so that the display frame secured to the gate moves with the gate from its retracted position to its extended position.

6. The computer of claim 5, wherein the means for removably securing each gate to the display frame comprises:
- a pin assembly comprising a retractable pin mounted through the display frame proximate and normal to the rearward slot; and
- an aperture on the gate adjacent to its frontal edge adapted to receive the pin,
- such that when the gate is inserted into the rearward slot, the pin may engage the aperture on the gate and the angle of the display frame may be adjusted.

7. The computer of claim 6, wherein
- the aperture on the gate comprises a cam cut proximate to and extending generally longitudinally along a portion of the gate's frontal edge, and
- the pin terminates in a cam follower, the cam follower engaging the cam cut in the gate when the gate is inserted into the rearward slot on the display frame,
so that the height of the display frame may be adjusted by moving said cam follower along the cam cut.

8. The computer of claim 7, wherein the cam cut has a notch for fixing the cam follower in a desired position.

9. The computer of claim 8, wherein the cam cut is arcuate.

10. The computer of claim 7, wherein the pin comprises a shank, a portion thereof being threaded, such that the pin be tightened into a desired position.

11. The computer of claim 5, further comprising means for locking each gate in a desired position.

12. The computer of claim 5, further comprising:
- a pin assembly comprising a retractable pin mounted through the rearward concave member proximate and generally normal to the gate; and
- a hole in the gate, the hole adapted to receive the pin and thereby lock the gate into a fixed position.

13. The computer of claim 12, wherein the pin assembly comprises a means for biasing the retractable pin against the gate.

14. The computer of claim 13, wherein there are two holes in the gate, the first hole located to lock the gate in its extended position and the second hold located to lock the gate in its retracted position.

15. The computer of claim 1, wherein
- the rearward concave member comprises a rearward end cap and top, bottom, and side walls, the side walls having portals located generally rearward of the mounting plate for accessing input and output components mounted within the rearward concave member;
- and further comprising a pair of gates slidably mounted to the side walls, such that the gates may move from a rearward retracted position to a forward extended position, the input and output components being covered by the gates in their retracted positions and revealed when the gates are moved to their extended positions.

16. The computer of claim 1, wherein
- the frontal concave member comprises a mounting bracket, the bracket attached to and extending rearwardly from the first member; and
- the display frame comprises a frontal slot on its front face positioned and sized to receive the mounting bracket, and a fastener proximate to the slot for releasably securing the mounting bracket when inserted into the slot.

17. The computer of claim 16, wherein the frontal concave member comprises storage compartments for storing computer accessories.

18. The computer of claim 17, further comprising a keyboard, a mouse, and a removable cover adapted to fit the opening of the frontal concave member and wherein the keyboard and mouse may be stored within the frontal member and held in position by the cover.

19. The computer of claim 16, wherein the rearward concave member comprises a top and a bottom, and further comprising at least one foot attached to the bottom of the rearward concave member.

20. The computer of claim 19, further comprising a handle attached to the top of the rearward concave member.

21. The computer of claim 16, further comprising
- at least one gate, the gate having a frontal edge and a rearward edge and being slidably mounted to the rearward concave member, such that the gate may move from a rearward retracted position to a forward extended position; and wherein
- the display frame comprises a rearward slot on its back face proximate and substantially parallel to the frontal slot, the rearward slot positioned and sized to accept the frontal edge of the gate; and
- the fastener comprises a retractable elongate pin, mounted to the display frame proximate and substantially normal to the frontal slot and the rearward slot, the pin having an extended inward position and a retracted outward position,
such that the pin may engage the mounting bracket and the gate when each is inserted into its corresponding slot and the pin is in its extended inward position.

22. The computer of claim 21, wherein the rearward slot is located interiorly of the frontal slot.

23. The computer of claim 22, wherein the gate comprises a cam cut and the pin comprises an elongate shank terminating into a cam follower, the cam follower adapted to fit within the cam cut and being of a smaller diameter than the shank, the shank engaging the mounting bracket and the cam follower engaging the cam cut.

24. The computer of claim 23, wherein the shank is threaded such that the pin may be tightened into a fixed position with the shank against the gate at the cam cut.

25. The computer of claim 24, wherein the pin assembly comprises a means for biasing the shank against the gate.

26. The computer of claim 1, wherein the rearward concave member comprises a midsection having top, bottom, and side walls and an end cap, the end cap fixed to midsection at the rearward perimeter of its side walls.

27. The computer of claim 1, wherein said display frame comprises an external frame wall, said external wall circumscribing the top, bottom, and sides of said display frame and extending generally between said front and back faces proximate their perimeters, such that the external frame wall serves as part of the casing for the computer when the display assembly is interposed between the front and rear concave members.

28. The computer of claim 1, wherein the mounting plate comprises a plurality of ventilation holes.

29. The computer of 28, wherein the ventilation holes are selectively located on the mounting plate to regulate air flow to selective areas within the rear concave member.

30. A computer comprising:
- processing, memory, and input/output components and
- a shock-absorbent casing for the components, the casing comprising:

a concave member having a closed end, an open end, and side walls therebetween, the side walls having a groove along their perimeter towards the open end and a plurality of supports fixed to the interior of the side walls inwardly of the groove;

a first gasket disposed within the groove;

a plurality of shock absorbers, each in contact with one of the supports; and a mounting plate in contact with the gasket and attached to the supports through the shock absorbers, the components mounted to the mounting plate on the side towards the closed end.

31. The computer of claim 30, wherein the mounting plate comprises at least one orthogonal wing extending inwardly towards the closed end of the concave member.

32. The computer of claim 31, wherein the wing is in contact with the closed end of the concave member.

33. The computer of claim 32, further comprising a second gasket interposed between and in contact with the wing and the closed end of the concave member.

34. The computer of claim 33, wherein the side edges of orthogonal wing extend to the side walls of the concave member.

35. The computer of claim 34, wherein the second gasket extends to the side walls of the concave member and is interposed between the side walls and the wing.

36. The computer of claim 35, wherein the wing is made of a deformable material, such that upon a mechanical shock to the computer the wing may deform to absorb at least a portion of the shock.

37. The computer of claim 35, wherein the mounting plate, the concave member, and the first and second gaskets are made of a conductive material, whereby a faraday cage is formed.

38. The computer of claim 35, wherein the first and second gaskets are tubular.

39. The computer of claim 30, wherein the memory components comprise at least one disk drive and further comprising means for isolating the disk drive from mechanical shock and vibration.

40. The computer of claim 30, wherein the mounting plate comprises a plurality of ventilation holes.

41. The computer of 40, wherein the ventilation holes are selectively located on the mounting plate to regulate air flow to selective areas within the concave member.

42. A computer comprising:

a base member in which computer processing, memory, and input/output components are mounted;

at least one gate, the gate having a frontal edge and a rearward edge and being slidably mounted to the base member, such that the gate may move from a rearward retracted position to a forward extended position;

a display assembly comprising a display having a viewable side and a display frame having a front face and a back face, said display mounted in said display frame with the viewable side towards the front face, the display frame comprising a rearwardly opening slot on its back face, the rearward slot positioned and sized to accept the frontal edge of the gate;

means for removably securing the gate to the display frame;

so that the display assembly secured to the gate moves with the gate from its retracted position to its extended position.

43. The computer of claim 42, wherein the means for removably securing each gate to the display frame comprises:

a pin assembly comprising a retractable pin mounted through the display frame proximate and normal to the rearward slot; and an aperture on the gate adjacent to its frontal edge adapted to receive the pin, such that when the gate is inserted into the rearward slot, the pin may engage the aperture on the gate and the angle of the display frame may be adjusted.

44. The computer of claim 43, wherein the aperture on the gate comprises a cam cut proximate to and extending generally longitudinally along a portion of the gate's frontal edge, and the pin terminates in a cam follower, the cam follower engaging the cam cut in the gate when the gate is inserted into the rearward slot on the display frame, so that the height of the display frame may be adjusted by moving said cam follower along the cam cut.

45. The computer of claim 49, wherein the cam cut has a notch for fixing the cam follower in a desired position.

46. The computer of claim 45, wherein the cam cut is arcuate.

47. The computer of claim 42, wherein the base member comprises a back end and top, bottom, and side walls, at least one side wall having a portal for accessing input and output components mounted within the base member; and the gate is slidably mounted to the side wall having the portal, the input and output components therein being covered by the gate in its retracted position and revealed when the gate is moved to its extended position.

* * * * *